United States Patent
Bondesen et al.

(10) Patent No.: US 10,002,352 B2
(45) Date of Patent: Jun. 19, 2018

(54) DIGITAL WALLET EXPOSURE REDUCTION

(71) Applicant: BANK OF AMERICA CORPORATION, Charlotte, NC (US)

(72) Inventors: Laura Corinne Bondesen, Charlotte, NC (US); Jason P. Blackhurst, Charlotte, NC (US); Scott Lee Harkey, Concord, NC (US); William Blakely Belchee, Charlotte, NC (US); Tammy L. Brunswig, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 545 days.

(21) Appl. No.: 14/196,545

(22) Filed: Mar. 4, 2014

(65) Prior Publication Data

US 2015/0254642 A1 Sep. 10, 2015

(51) Int. Cl.
| | |
|---|---|
| *G06Q 40/00* | (2012.01) |
| *G06Q 20/36* | (2012.01) |
| *G06Q 20/08* | (2012.01) |
| *G06Q 20/32* | (2012.01) |
| *G06Q 20/34* | (2012.01) |
| *G06Q 20/38* | (2012.01) |
| *G06Q 20/40* | (2012.01) |

(52) U.S. Cl.
CPC ....... *G06Q 20/363* (2013.01); *G06Q 20/0855* (2013.01); *G06Q 20/3278* (2013.01); *G06Q 20/354* (2013.01); *G06Q 20/385* (2013.01); *G06Q 20/4016* (2013.01)

(58) Field of Classification Search
CPC .................................................. G06Q 40/00
USPC ........................................................ 705/41
See application file for complete search history.

(56) References Cited

U.S. PATENT DOCUMENTS

| | | | |
|---|---|---|---|
| 4,766,293 | A | 8/1988 | Boston |
| 5,438,186 | A | 8/1995 | Nair et al. |
| 6,119,103 | A | 9/2000 | Basch et al. |
| 6,254,000 | B1 | 7/2001 | Degen et al. |
| 6,330,546 | B1 | 12/2001 | Gopinathan et al. |

(Continued)

FOREIGN PATENT DOCUMENTS

| | | |
|---|---|---|
| WO | WO 2012058099 | 5/2012 |
| WO | WO 2013095486 | 6/2013 |

OTHER PUBLICATIONS

European Patent Application No. 01400506 filed on Feb. 28, 2001, and printed as document No. EP 1132876 A2 entitled "Electronic Wallet System with Secure Inter-purse Operations" by inventor Tang-Talpin et al.

(Continued)

*Primary Examiner* — Hai Tran
(74) *Attorney, Agent, or Firm* — Michael A. Springs; Moore & Van Allen PLLC; Patrick B. Horne

(57) ABSTRACT

Embodiments are directed to reducing digital wallet exposure. Embodiments determine that a potential exposure associated with a first payment credential associated with a digital wallet has been detected; determine that the digital wallet has at least one additional associated payment credential; and, in response to determining the potential exposure has been detected and determining that the digital wallet has at least one additional associated payment credential, initiate at least one exposure reduction measure intended to reduce potential exposure to the at least one additional associated payment credential.

20 Claims, 7 Drawing Sheets

(56) References Cited

U.S. PATENT DOCUMENTS

| | | |
|---|---|---|
| 6,422,462 B1 | 7/2002 | Cohen |
| 6,516,056 B1 | 2/2003 | Justice et al. |
| 6,658,393 B1 | 12/2003 | Basch et al. |
| 6,718,328 B1 | 4/2004 | Norris |
| 7,136,835 B1 | 11/2006 | Flitcroft et al. |
| 7,177,838 B1 | 2/2007 | Ling |
| 7,328,189 B2 | 2/2008 | Ling |
| 7,337,144 B1 | 2/2008 | Blinn et al. |
| 7,398,250 B2 | 7/2008 | Blinn et al. |
| 7,581,674 B2 | 9/2009 | Cohen et al. |
| 7,596,530 B1 | 9/2009 | Glasberg |
| 7,606,560 B2 | 10/2009 | Labrou et al. |
| 7,610,040 B2 | 10/2009 | Cantini et al. |
| 7,657,489 B2 | 2/2010 | Stambaugh |
| 7,693,771 B1 | 4/2010 | Zimmerman et al. |
| 7,698,221 B2 | 4/2010 | Blinn et al. |
| 7,739,169 B2 | 6/2010 | Hammad |
| 7,742,967 B1 | 6/2010 | Keresman, III et al. |
| 7,784,684 B2 | 8/2010 | Labrou et al. |
| 7,835,960 B2 * | 11/2010 | Breck .................... G06Q 10/04 705/35 |
| 7,848,980 B2 | 12/2010 | Carlson |
| 7,992,779 B2 | 8/2011 | Phillips et al. |
| 8,032,932 B2 | 10/2011 | Speyer et al. |
| 8,171,531 B2 | 5/2012 | Buer |
| 8,249,805 B2 | 8/2012 | de Silva et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,336,766 B1 | 12/2012 | Miller et al. |
| 8,346,666 B2 | 1/2013 | Lindelsee et al. |
| 8,380,177 B2 | 2/2013 | Laracey |
| 8,395,242 B2 | 3/2013 | Oliver et al. |
| 8,407,142 B1 | 3/2013 | Griggs |
| 8,423,466 B2 | 4/2013 | Lane |
| 8,498,940 B2 | 7/2013 | Pelegero et al. |
| 8,522,039 B2 | 8/2013 | Hyndman et al. |
| 8,527,406 B2 | 9/2013 | Cohen |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,620,790 B2 | 12/2013 | Priebatsch |
| 8,682,802 B1 | 3/2014 | Kannanari |
| 8,788,333 B2 | 7/2014 | Alba et al. |
| 8,788,429 B2 | 7/2014 | Ticken |
| 8,789,162 B2 | 7/2014 | Radhakrishnan |
| 8,839,383 B2 | 9/2014 | Van Horn |
| 8,868,458 B1 | 10/2014 | Starbuck et al. |
| 8,943,574 B2 | 1/2015 | Bailey et al. |
| 8,985,442 B1 | 3/2015 | Zhou et al. |
| 8,996,423 B2 | 3/2015 | Johnson et al. |
| 9,055,053 B2 | 6/2015 | Radhakrishnan et al. |
| 9,069,943 B2 | 6/2015 | Radhakrishnan et al. |
| 2003/0004866 A1 | 1/2003 | Huennekens et al. |
| 2003/0061170 A1 | 3/2003 | Uzo |
| 2003/0105714 A1 | 6/2003 | Alarcon-Luther et al. |
| 2003/0163787 A1 | 8/2003 | Hay et al. |
| 2005/0222961 A1 | 10/2005 | Staib et al. |
| 2006/0287004 A1 | 12/2006 | Fuqua |
| 2007/0055594 A1 | 3/2007 | Rivest et al. |
| 2008/0109319 A1 | 5/2008 | Foss |
| 2008/0162338 A1 | 7/2008 | Samuels et al. |
| 2008/0162589 A1 * | 7/2008 | Rodeheffer ......... G06F 11/1469 |
| 2008/0167965 A1 | 7/2008 | Von Nothaus |
| 2008/0189210 A1 | 8/2008 | Sawhney |
| 2008/0195499 A1 | 8/2008 | Meredith et al. |
| 2009/0006230 A1 | 1/2009 | Lyda et al. |
| 2009/0057396 A1 | 3/2009 | Barbour et al. |
| 2009/0119190 A1 | 5/2009 | Realini |
| 2009/0164327 A1 | 6/2009 | Bishop et al. |
| 2010/0036741 A1 | 2/2010 | Cleven |
| 2010/0241571 A1 | 9/2010 | McDonald |
| 2010/0268645 A1 | 10/2010 | Martino et al. |
| 2010/0312636 A1 | 12/2010 | Coulter et al. |
| 2011/0022483 A1 | 1/2011 | Hammad |
| 2011/0166992 A1 | 7/2011 | Dessert et al. |
| 2011/0218907 A1 | 9/2011 | Dessert et al. |
| 2011/0251892 A1 | 10/2011 | Laracey |
| 2011/0277016 A1 | 11/2011 | Hockings et al. |
| 2011/0288996 A1 | 11/2011 | Kreutz et al. |
| 2012/0030047 A1 | 2/2012 | Fuentes et al. |
| 2012/0158540 A1 | 6/2012 | Ganti et al. |
| 2012/0158586 A1 | 6/2012 | Ganti et al. |
| 2012/0166334 A1 | 6/2012 | Kimberg et al. |
| 2012/0179558 A1 | 7/2012 | Fischer |
| 2012/0197794 A1 | 8/2012 | Grigg et al. |
| 2012/0203700 A1 | 8/2012 | Ornce et al. |
| 2012/0252365 A1 * | 10/2012 | Lam .................... G07C 9/00309 455/41.2 |
| 2012/0271712 A1 | 10/2012 | Katzin et al. |
| 2012/0290482 A1 | 11/2012 | Atef et al. |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0036048 A1 | 2/2013 | Campos et al. |
| 2013/0054336 A1 | 2/2013 | Graylin |
| 2013/0054470 A1 | 2/2013 | Campos et al. |
| 2013/0085927 A1 | 4/2013 | Scott |
| 2013/0110658 A1 * | 5/2013 | Lyman .................... G06Q 20/20 705/18 |
| 2013/0124346 A1 | 5/2013 | Baldwin et al. |
| 2013/0159178 A1 | 6/2013 | Colon et al. |
| 2013/0166332 A1 | 6/2013 | Hammad |
| 2013/0179341 A1 | 7/2013 | Boudreau |
| 2013/0191227 A1 | 7/2013 | Pasa et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304651 A1 | 11/2013 | Smith |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0129357 A1 * | 5/2014 | Goodwin ............... G06Q 30/02 705/16 |
| 2014/0143145 A1 | 5/2014 | Kortina |
| 2014/0188719 A1 | 7/2014 | Poornachandran et al. |
| 2014/0214640 A1 | 7/2014 | Mallikarjunan et al. |
| 2014/0244493 A1 | 8/2014 | Kenyon et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0330721 A1 | 11/2014 | Wang |
| 2014/0337175 A1 | 11/2014 | Katzin et al. |
| 2015/0019317 A1 | 1/2015 | Mitchell |
| 2015/0019439 A1 | 1/2015 | Phillips |
| 2015/0032627 A1 | 1/2015 | Dill et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0120569 A1 | 4/2015 | Belshe et al. |
| 2015/0206137 A1 | 7/2015 | Mazarim Fernandes |
| 2015/0220914 A1 | 8/2015 | Purves et al. |

(56) References Cited

U.S. PATENT DOCUMENTS

2015/0254648 A1 9/2015 Clements et al.
2015/0254653 A1 9/2015 Bondesen et al.
2015/0254664 A1 9/2015 Bondesen et al.

OTHER PUBLICATIONS

Simon, "Credit-Card Reward Programs: A Short History"; Creditcards.com, Nov. 2006, 4 pages.
Lane, "History of APIs"; APIEvangelist.com; Dec. 2012, 11 pages.
"Digital Wallet to Pay for Travel Hasn't Arrived Yet"; Orlando Sentinel [Orlando Fla], Jan. 27, 2013; p. J.6.
"World's First and Only Global Mobile Wallet Sees Strong User Adoption with 150 Million Miles Loaded to Cash in First Month of Launch", Business Wire, Nov. 28, 2012, Zurich.

* cited by examiner

DIGITAL WALLET EXPOSURE REDUCTION

BACKGROUND

In the new technological age, the security of personal information, or the lack thereof, has become an issue that concerns many people. As a result, several business industries, such as financial institutions, have taken precautionary measures to ensure the safety and protection of their customers' information. This is typically accomplished by verifying a user's identity prior to transferring any personal information using an electronic means.

BRIEF SUMMARY

Embodiments of the invention are directed to an apparatus for reducing digital wallet exposure. The apparatus includes a memory; a processor; and a module stored in the memory, executable by the processor, and configured to determine that a potential exposure associated with a first payment credential associated with a digital wallet has been detected; determine that the digital wallet has at least one additional associated payment credential; and, in response to determining the potential exposure has been detected and determining that the digital wallet has at least one additional associated payment credential, initiate at least one exposure reduction measure intended to reduce potential exposure to the at least one additional associated payment credential.

In some embodiments, initiating at least one exposure reduction measure comprises initiating at least one alert corresponding to the at least one second payment credential. In some such embodiments, the at least one alert comprises information indicating that a potential exposure associated with another payment credential associated with the digital wallet has been detected.

In some embodiments, initiating at least one exposure reduction measure comprises initiating cancellation of the at least one second payment credential; and initiating at least one alert corresponding to the at least one second payment credential, wherein the alert comprises information indicating the at least one second payment credential has been or is being cancelled. In some such embodiments, initiating at least one exposure reduction measure further comprises initiating at least one message asking a customer associated with the digital wallet whether the first payment credential or the at least one second payment credentials should be re-issued.

In some embodiments, initiating at least one alert corresponding to the at least one second payment credentials comprises initiating at least one message asking a customer associated with the digital wallet whether the at least one second payment credential should be cancelled. In some such embodiments, the module is further configured to receive customer input indicating that the at least one second payment credential should be cancelled; and, in response, initiating cancellation of the at least one second payment credential. In some such embodiments, the module is further configured to, in response to receiving customer input indicating that the at least one second payment credential should be cancelled, initiating issuance of at least one new payment credential for replacing the at least one second payment credential. In other such embodiments, the module is further configured to, in response to receiving customer input indicating that the at least one second payment credential should be cancelled, initiating at least one message asking the customer whether a new payment credential should be issued. In some such embodiments, the module is further configured to receive customer input indicating that a new payment credential should be issued; and initiate issuance of at least one new payment credential for replacing the at least one second payment credential.

In some embodiments, initiating at least one exposure reduction measure comprises initiating at least one alert corresponding to the digital wallet, wherein the at least one alert comprises instructions to communicate the at least one alert to all payment credentials associated with the digital wallet. In some such embodiments, the module is further configured to receive the instructions to communicate the at least one alert to all payment credentials associated with the digital wallet; and initiate communication of at least one message to the customer for each payment credential associated with the digital wallet. In some such embodiments, the at least one message is communicated as a pop-up message on the apparatus.

According to embodiments of the invention, a method for reducing digital wallet exposure includes determining, by a processor, that a potential exposure associated with a first payment credential associated with a digital wallet has been detected; determining, by the processor, that the digital wallet has at least one additional associated payment credential; and, in response to determining the potential exposure has been detected and determining that the digital wallet has at least one additional associated payment credential, initiating, by the processor, at least one exposure reduction measure intended to reduce potential exposure to the at least one additional associated payment credential. In some such embodiments, initiating at least one exposure reduction measure comprises initiating at least one alert corresponding to the at least one second payment credential. In some of these embodiments, the at least one alert comprises information indicating that a potential exposure associated with another payment credential associated with the digital wallet has been detected.

In some embodiments, initiating at least one exposure reduction measure comprises initiating cancellation of the at least one second payment credential; and initiating at least one alert corresponding to the at least one second payment credential, wherein the alert comprises information indicating the at least one second payment credential has been or is being cancelled.

According to embodiments of the invention, a computer program product for reducing digital wallet exposure includes a non-transitory computer-readable medium including code causing a first apparatus to determine that a potential exposure associated with a first payment credential associated with a digital wallet has been detected; determine that the digital wallet has at least one additional associated payment credential; and, in response to determining the potential exposure has been detected and determining that the digital wallet has at least one additional associated payment credential, initiate at least one exposure reduction measure intended to reduce potential exposure to the at least one additional associated payment credential.

In some embodiments the code further causes the first apparatus to initiate at least one alert corresponding to the at least one second payment credential. In some such embodiments, the at least one alert comprises information indicating that a potential exposure associated with another payment credential associated with the digital wallet has been detected.

BRIEF DESCRIPTION OF THE DRAWINGS

Figure 1:
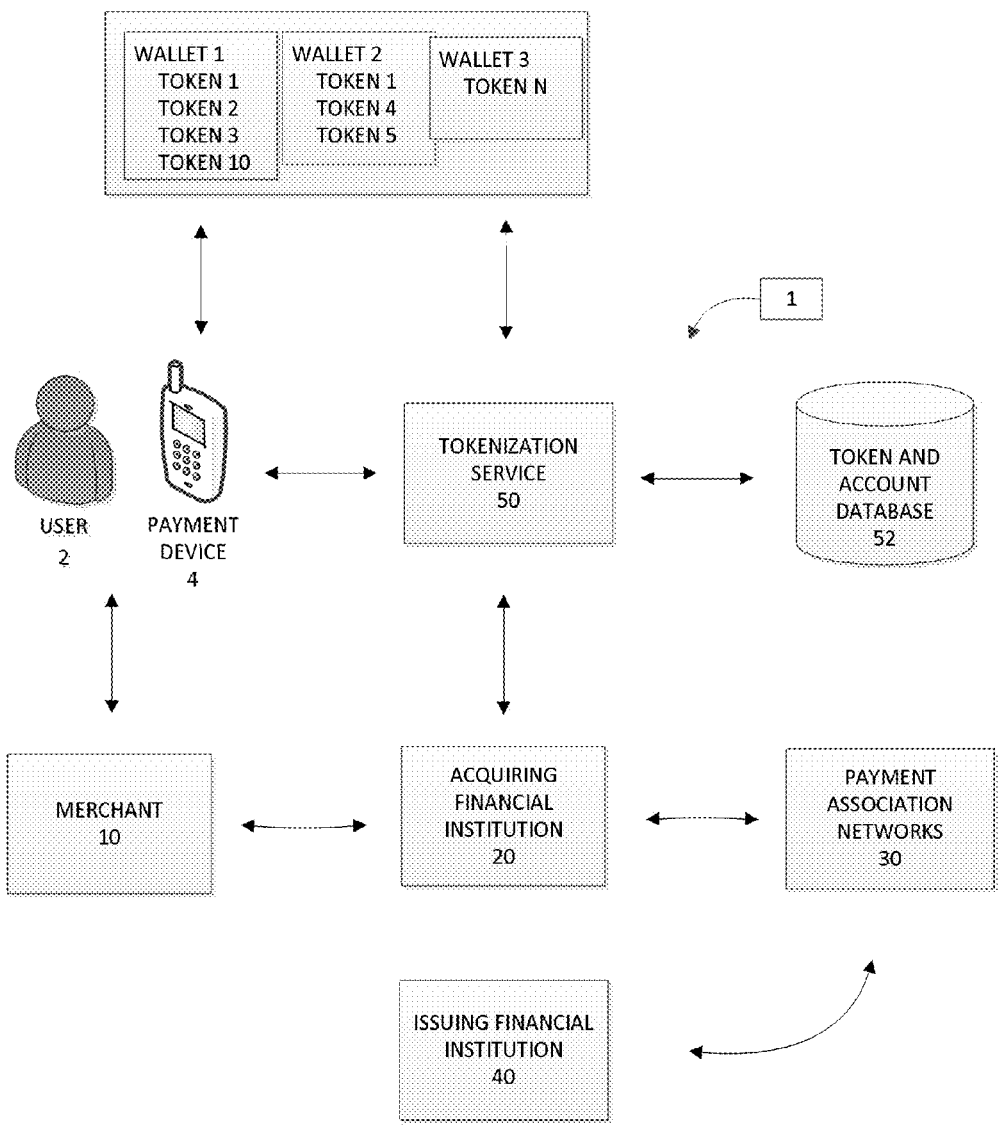
Figure 2:
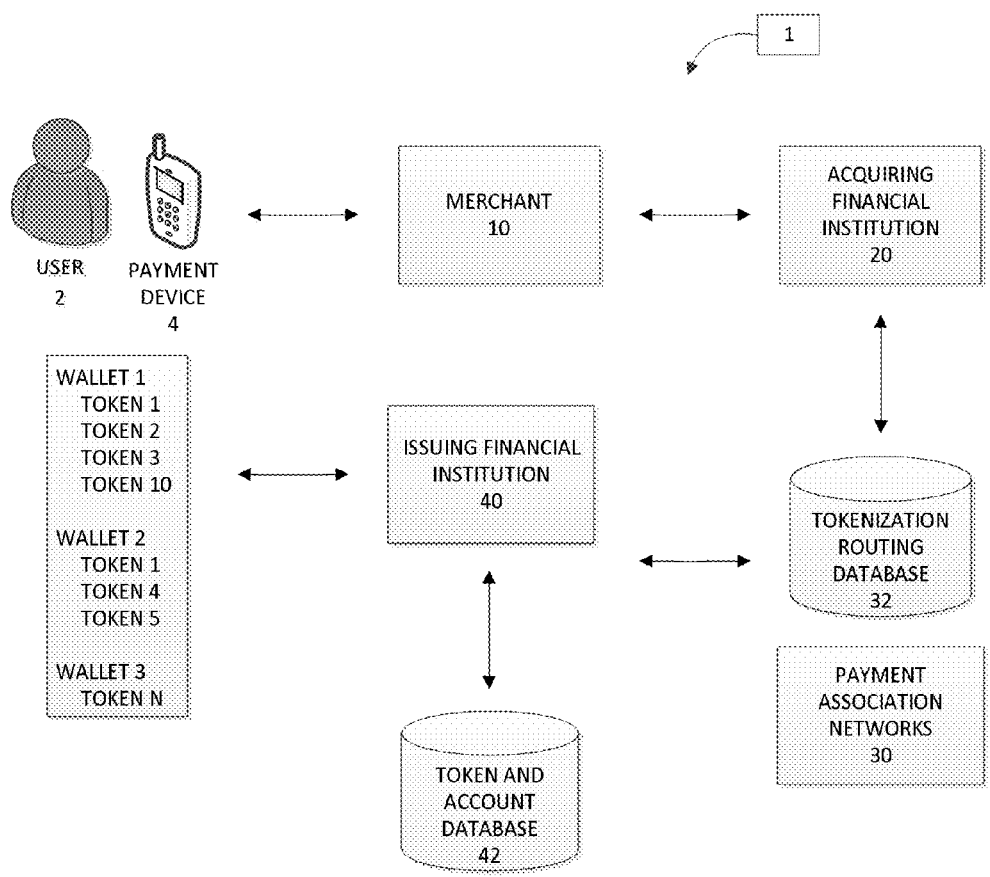
Figure 3:
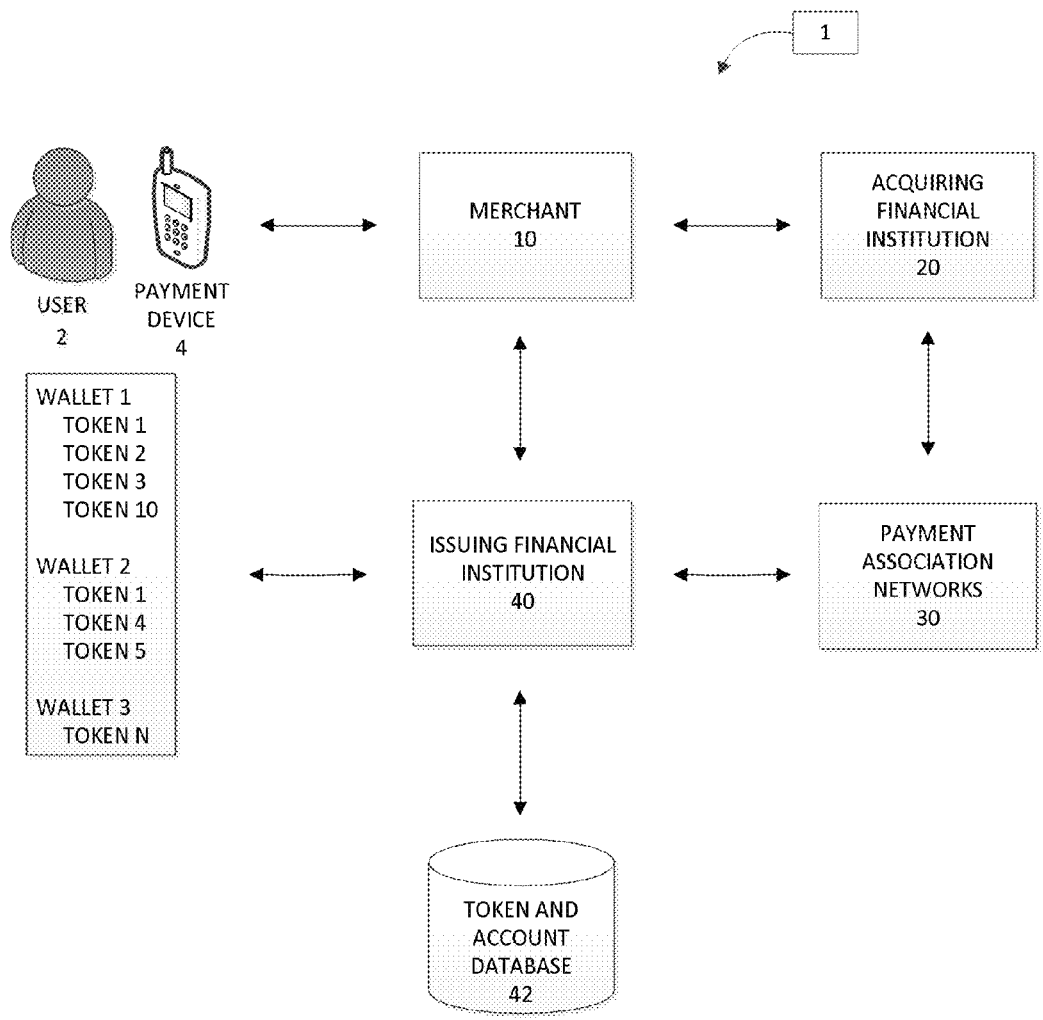
Figure 4:
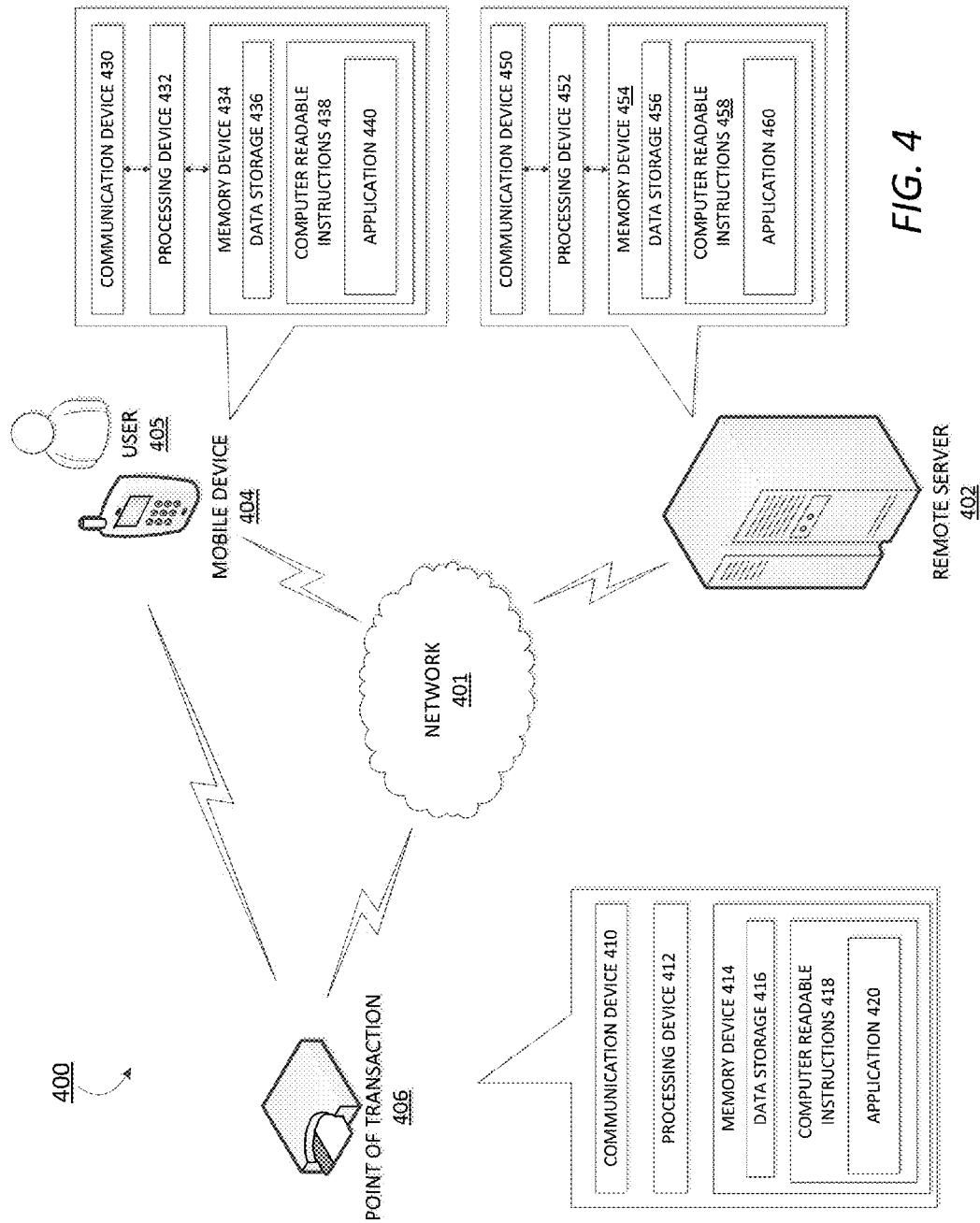
Figure 5:
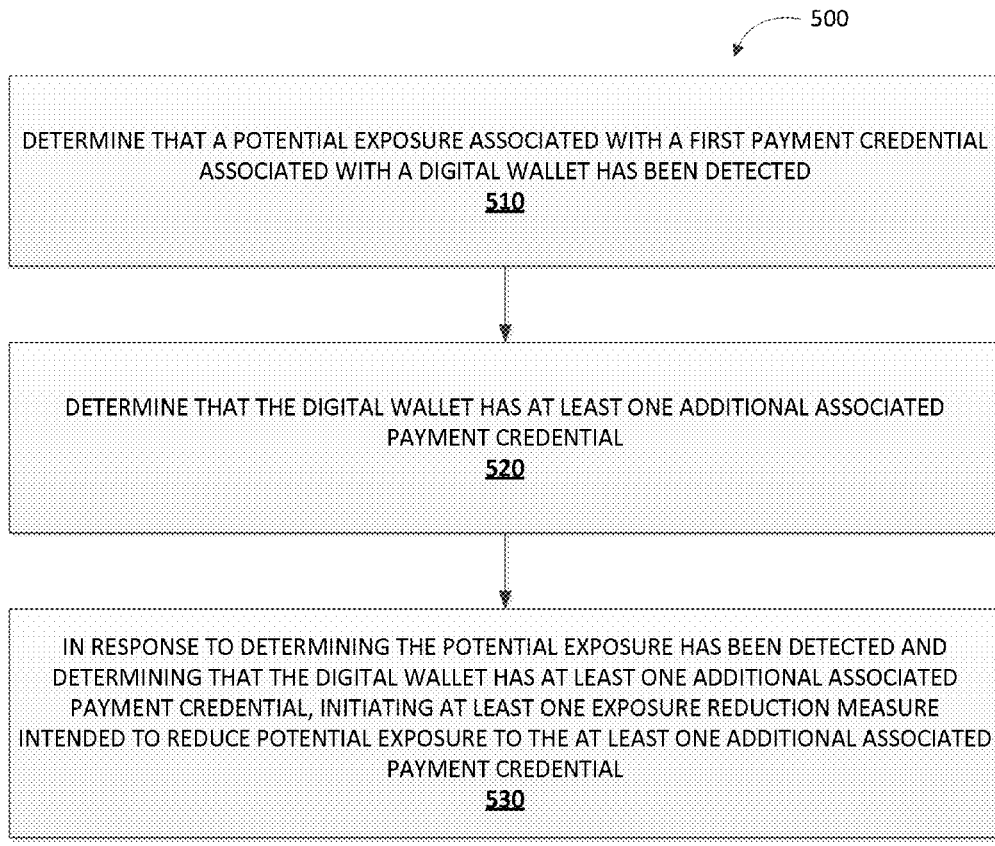
Figure 6:
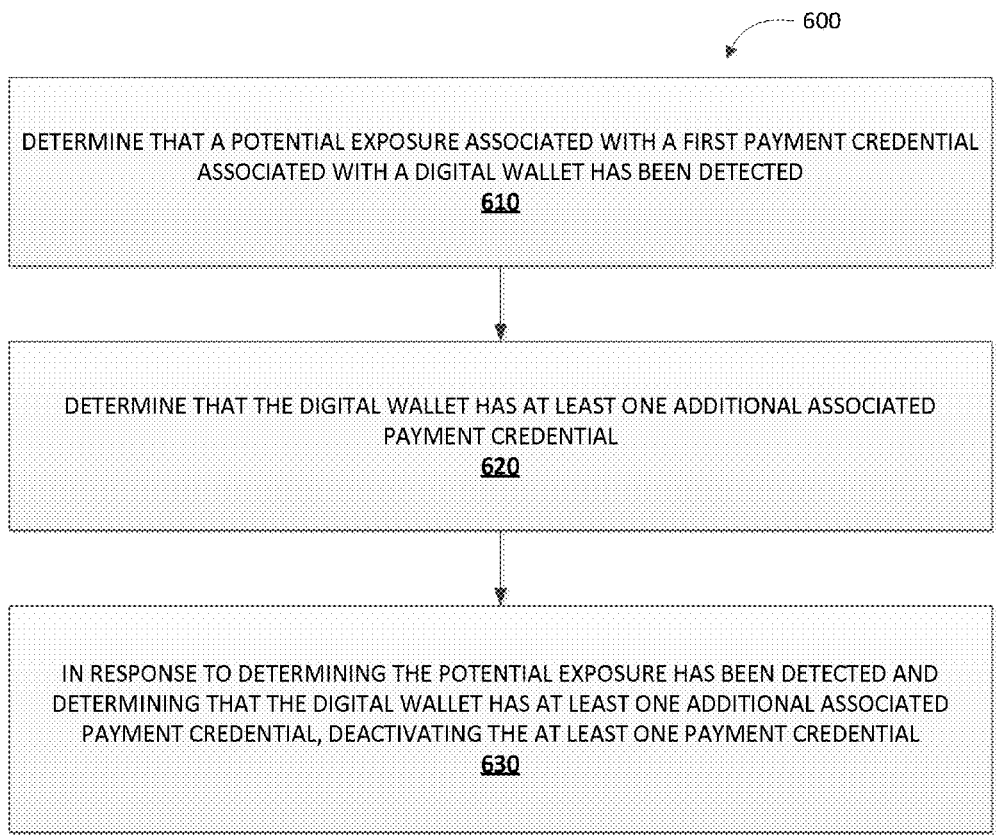
Figure 7:
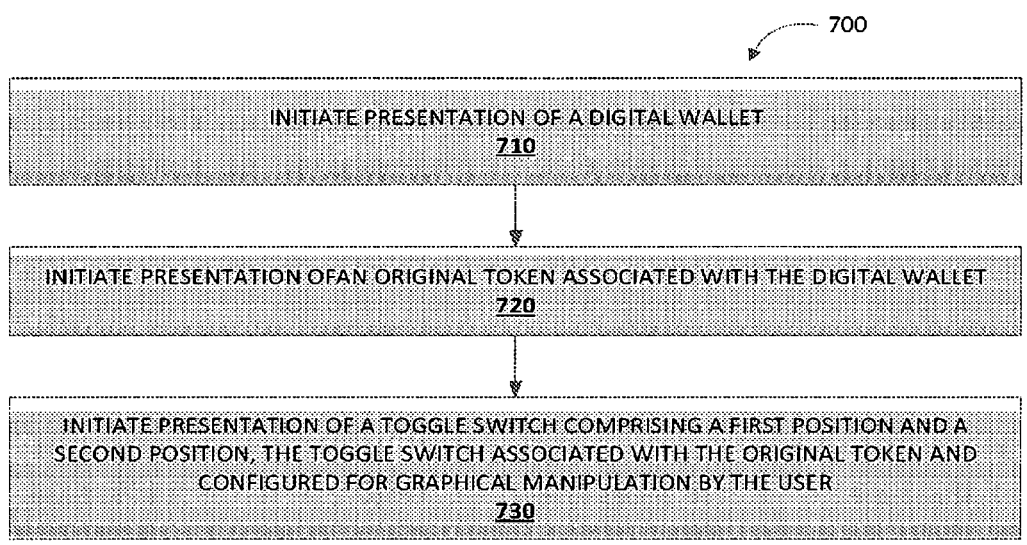

Having thus described embodiments of the invention in general terms, reference will now be made to the accompanying drawings, where:

FIG. 1 is a diagram illustrating a token system, in accordance with embodiments of the present invention;

FIG. 2 is a diagram illustrating a token system, in accordance with embodiments of the present invention;

FIG. 3 is a diagram illustrating a token system, in accordance with embodiments of the present invention;

FIG. 4 is a diagram illustrating an environment in which systems according to embodiments of the invention operate;

FIG. 5 is a flowchart illustrating a method for reducing digital wallet exposure according to embodiments of the invention;

FIG. 6 is a flowchart illustrating a method for reducing payment credential exposure according to embodiments of the invention; and FIG. 7 is a flowchart illustrating a method for digital wallet management according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The embodiments presented herein are directed to systems, methods, apparatuses, and computer program products for reducing exposure for payment credentials associated with a digital wallet in the case of a detected potential exposure of a payment credential associated with the digital wallet. As presented herein, one or more exposure reducing measures are taken with regard to payment credentials associated with (i.e., authenticated into) a digital wallet that has another payment credential that may have suffered an exposure. In some cases, a payment transaction associated with a payment credential is a trigger for an indication of a potential exposure of the payment credential. In some embodiments, a system associated with a financial institution of the consumer receives a request for processing a payment from a point of sale terminal of a merchant. The system of the financial institution may evaluate the information associated with the purchase transaction, such as an amount of the purchase or a geographic location of the purchase transaction. When the system of the financial institution determines that exposure to a potential financial loss to the consumer is likely based on the information associated with the purchase transaction, the system then determines that the payment credential is associated with a particular digital wallet of a user's mobile device. The system then determines that there are other payment credentials associated with the same digital wallet, and, therefore, determines that the potential exposure to the other payment credentials of the digital wallet indicates that some exposure reducing measure(s) should be taken.

If potential exposure is detected for one payment credential in a digital wallet, then exposure alerts may be sent to the digital wallet. If potential loss of mobile device occurs, then every token associated with the device may be reissued. An email may be sent to customers if a device is compromised and ask for authorization to send new token. In some cases, alerts ask the customer whether to deactivate the other credentials associated with the digital wallet.

In some embodiments, in the event of a potential exposure of a mobile device (e.g., a stolen device), then every payment credential (i.e., token) associated with the mobile device is automatically deactivated. A communication such as an email is sent to the customer to determine whether new credentials should be issued.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "filtration" or "filter" refers to the means or the process of analyzing aspects of a purchase transaction or a financial transaction to evaluate a potential exposure to loss associated with a transaction due to a number of factors including, but not limited to, a compromised payment vehicle or a compromised POS system.

In accordance with embodiments of the invention "account events" comprise any interactions that an individual, such as a customer or unauthorized user may have with an account of the customer. The account may be a financial account, digital wallet, or a customer profile account, which stores customer information, such as addresses, telephone numbers or the like. The interactions with the accounts may be direct or indirect. Indirect interaction may include an online or mobile banking session, in which the individual may not specifically interact with accounts but performs some other financial institution-related activity. As such, account event data may include, but is not limited to, data related to changing account authorization credentials, such as a user identifier and/or password; ordering/re-ordering financial products, such as checks, debit/credit card; changing payment credentials; linking one account to one or more other accounts; opening and/or closing accounts; addition and/or deletion of account users; changing customer or account-specific personal information, such as mailing address; balance inquiries and the like. In some embodiments the account events may be "non-monetary events" such that monetary events are not related to the account events, however, in some embodiments the account events may include a monetary component.

In accordance with embodiments of the invention, "account activities" refers to historical patterns in the transactions of a consumer over a period of time. For example, the "velocity" or "velocity count" is part of account activities and refers to the number of transactions or cumulative amounts of transactions associated with an account, payment vehicles, or related accounts that occurs within a specified time period; for example, eleven transactions of $50 within a day, seven transactions of $1000 or more within an hour. In other embodiments, "transaction history" is a party of account activities, and refers to the types, amounts, locations, products, or other patterns in the purchasing history of the account.

In accordance with embodiments of the invention, "geo-positioning" or "geo-caching" refers to the physical location associated with a financial transaction or account event. Geo-positioning may utilize information about the location of each transaction or account events related to one or more customer accounts. Geo-positioning may relate to each of the types of information described above (i.e., transaction information, account activities, and account events).

For example, the geo-positioning of a point of sale (POS) transaction may be the physical location of the POS, the geo-positioning of an Internet transaction may be the IP address of the user, and the like. Geo-positioning data includes: a physical address; a post office box address; an IP address; a phone number, a locality (e.g., a state, a county, a city, and/or the like); a country; geographic coordinates; or any other type of data that indicates a geographical location. The geo-positioning data can be associated with a transaction, an account event, a user, a transaction device (e.g., POS, automated teller machine (ATM), physical teller at a bank, consumer mobile device, or the like), a financial institution, a business, the location of the user's mobile device, and the like. The geo-positioning data may include, for example, a place of domicile of a user, a work location of a user, a secondary home (e.g., a vacation home), etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

Various embodiments of the present invention relate to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

Referring to FIG. 4, a network environment is illustrated in accordance with embodiments of the present invention. As illustrated in FIG. 4, the remote server 402 is operatively coupled via a network 401 to the mobile device 404 and/or a point of transaction (POT) 406. In this configuration, the remote server 402 may send information to and receive information from the mobile device 404 and/or the POT 406. Additionally, the mobile device 404 may send and receive communications directly from the POT 406. The remote server 402 may be or include one or more network base stations or other network components. FIG. 4 illustrates only one example of an embodiment of a network environment 400, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wireline, wireless, or a combination wireline and wireless communication between devices on the network 401.

In some embodiments, the user 405 is an individual who maintains cellular products with one or more providers.

As illustrated in FIG. 4, the remote server 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 4, the network remote server 402 comprises computer readable instructions 458 of an application 460. In some embodiments, the memory device, 454 includes data storage 456 for storing data related to and/or used by the application 460. The application 460 may perform one or more of the steps and/or sub-steps discussed herein and/or one or more steps not discussed herein. For example, in some embodiments, the application 460 may determine an exposure has occurred, determine a digital wallet has an associated payment credential and/or initiate one or more exposure reduction measures.

As illustrated in FIG. 4, the mobile device 404 generally comprises a communication device 430, a processing device 432, and a memory device 434. The processing device 432 is operatively coupled to the communication device 430 and the memory device 434. In some embodiments, the processing device 432 may send or receive data from the mobile device 404, to the remote server 402 via the communication device 430 over a network 401. As such, the communication device 430 generally comprises a modem, server, or other device for communicating with other devices on the network 401.

As further illustrated in FIG. 4, the mobile device 404 comprises computer readable instructions 438 stored in the memory device 434, which in one embodiments includes the computer-readable instructions 438 of an application 440. In the embodiment illustrated in FIG. 4, the application 440 allows the mobile device 404 to be linked to the remote server 402 to communicate, via a network 401. The application 440 may also allow the mobile device to connect directly (i.e. locally or device to device) with the POT 406 for performing a transaction. The application 440 may perform one or more of the steps and/or sub-steps discussed herein and/or one or more steps not discussed herein. For example, in some embodiments, the application 440 may determine an exposure has occurred, determine a digital wallet has an associated payment credential and/or initiate one or more exposure reduction measures.

As illustrated in FIG. 4, the POT 406 may include a communication device 410, a processing device 412, and a memory device 414. The processing device 412 is operatively coupled to the communication device 410 and the memory device 414. In some embodiments, the processing device 412 may send or receive data from the mobile device 404 and/or the remote server 402 via the communication device 410. Such communication may be performed either over a direct connection and/or over a network 401. As such, the communication device 410 generally comprises a modem, server, or other device for communication with other devices on the network 401.

As further illustrated in FIG. 4, the POT 406, comprises computer-readable instructions 418 of an application 420. In the embodiment illustrated in FIG. 4, the application 420 allows the ATM 406 to be linked to the remote server 402 to communicate, via a network 401. The application 420 may also allow the mobile device 406 to connect directly (i.e., locally or device to device) with the POT 406 or indirectly through the network 401. The application 420 may perform one or more of the steps and/or sub-steps discussed herein and/or one or more steps not discussed herein.

It is understood that the servers, systems, and devices described herein illustrate one embodiment of the invention. It is further understood that one of more of the server, systems, and devices can be combined in other embodiments and still function in the same or similar way as the embodiments described herein.

In various embodiments, the POT device may be or include a merchant machine and/or server and/or may be or include the mobile device of the user may function as a point of transaction device. The embodiments described herein may refer to the use of a transaction, transaction event or point of transaction event to trigger the steps, functions, routines etc. described herein. In various embodiments, occurrence of a transaction triggers the sending of information such as alerts and the like. Unless specifically limited by the context, a "transaction", "transaction event" or "point of transaction event" refers to any communication between the user and the merchant, e.g. financial institution, or other entity monitoring the user's activities. In some embodiments, for example, a transaction may refer to a purchase of goods or services, a return of goods or services, a payment transaction, a credit transaction, or other interaction involving a user's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

As used herein, a "user device" or "mobile device" may be a point-of-transaction device as discussed, or may otherwise be a device carried by a user configured to communicate across a network such as a cellular network, wireless fidelity network or otherwise. As used here a "user" refers to a previous customer or a non-customer of one or more merchants or entities associated with one or more merchants.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a point-of-transaction device is operated in a public place (e.g., on a street corner, at the doorstep of a private residence, in an open market, at a public rest stop, etc.). In other embodiments, the point-of-transaction device is additionally or alternatively operated in a place of business (e.g., in a retail store, post office, banking center, grocery store, factory floor, etc.). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, etc.). In yet other embodiments, the point-of-transaction device is owned by the financial institution offering the point-of-transaction device providing functionality in accordance with embodiments of the invention described herein.

Referring now to FIG. 5, a flowchart illustrates a method for reducing digital wallet exposure according to embodiments of the invention. In various embodiments, the method 500 includes determining that a potential exposure associated with a first payment credential and associated with a digital wallet has been detected, as represented by block 510. The next step, as represented by block 520, is to determine that the digital wallet has at least one additional associated payment credential. And finally, as represented by block 530 and in response to determining the potential exposure has been detected and determining that the digital wallet has at least one additional associated payment credential, the method includes initiating at least one exposure reduction measure intended to reduce potential exposure to the at least one additional associated payment credential.

Determining that a potential exposure associated with a first payment credential and associated with a digital wallet has been detected may be performed in a variety of ways. For example, a financial institution or issuer of a payment vehicle can identify a potentially compromised transaction involving the payment vehicle and perform one or more actions intended to limit the potential exposure to financial loss. As such, the issuer of the payment vehicle can receive transaction information in real-time, as the transaction is being processed, in order to evaluate the details of the transaction and at the same time initiate mitigation step(s) when the system of the issuer determines that the transaction may be compromised.

The phrase "information associated with the purchase transaction," as used herein, may include any information related to a transaction that is pending or has been completed involving one or more accounts or payment vehicles associated with a consumer. It will be understood that the information received may also include consumer transaction information that may broadly include any other transaction or information associated with a non-purchase or purchase transaction. For example, transaction information may be the amount of a transaction, the location of a transaction, the merchant involved in the transaction; the product (i.e., good or service) that the consumer is purchasing or has purchased in the transaction, payment information including the one or more accounts or payment vehicles associated with the transaction, the channel from which the transaction is received, and the like. In some embodiments, payment information includes information, such as consumer account numbers, PINs, tokens, payment vehicles, and/or other consumer and account identifiers, is entered by the consumer and/or cashier using a mobile device or digital wallet or by swiping a transaction card (e.g., bankcard, credit card, or the like), scanning some other machine-readable code associated with the consumer or consumer's financial account, and/or manually entering information into an input device, such as a keypad or touchpad.

Further, the term "payment credential" or "payment vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an automated teller machine (ATM) or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like).

In some embodiments, information associated with the purchase transaction is received from a POT including a point-of-sale (POS) terminal during a transaction involving a consumer and a merchant. For example, a consumer checking out at a retail merchant, such as a grocer, may provide to the grocer the one or more goods or products that he is purchasing together with a payment method, loyalty card, and possibly personal information, such as the name of the consumer. This information along with information about the merchant may be aggregated or collected at the POS terminal and routed to the system or server of the present invention or otherwise a third party affiliate of an entity managing the system of this invention. In other embodiments when the purchase transaction occurs over the Internet, the information associated with the purchase transaction is collected at a server providing an interface for conducting the Internet transaction. In such an embodiment, the consumer enters product, payment, and possibly personal information, such as a shipping address, into the online interface, which is then collected by the server. The server may then aggregate the transaction information together with merchant information and route the transaction and merchant information to the system of the present invention. It will be further be understood that the information associated with the purchase transaction may be received from any channel such as an automated teller machine (ATM), Internet, peer-to-peer network, POS, and/or the like.

The term "potential exposure to loss," as used herein, refers to any of, but is not limited to, the possibility of economic loss (e.g., financial loss), the possibility of a loss of data (e.g., personally identifiable information and the like), a possibility of a loss of access, a possibility of a compromised payment vehicle or information associated with a payment vehicle, and/or the like.

The system, in some embodiments, can be configured to determine a potential exposure to loss in a number of ways. Once the information associated with the purchase transaction is received, the system may then analyze the information for determine a potential exposure to loss. For example, in some embodiments, the system is configured to determine or identify certain events that may cause a loss and thus act as triggering events for initiating one or more processes for protecting the customer from loss. For example, in some embodiments, the system is configured to determine that the payment vehicle is compromised based on a series of unusual transactions involving the payment vehicle. In such a circumstance, upon detecting the unusual transactions involving the payment vehicle, the system may automatically initiate processes for cancelling a previously issued token and generating or issuing a new token having limited transaction capabilities. In another example, in some embodiments, the system is configured to receive a manual or automated notification of unusual activity from a merchant or other third party (e.g., individual who finds lost transaction card, or the like) which would then trigger customer protection processes by the system. In yet another example, in some embodiments, the transaction card is a smart card that can be geographically located based on integrated global or local tracking technology or the like and the system is configured to determine that the transaction card is compromised or misplaced based on a determined location of the transaction card.

Further, the system may implement a misappropriation or compromised payment vehicle filtering process that identifies anomalous occurrences indicating a likelihood of an exposure to loss. The filtering process may include multiple levels of filtration including a first level and a second level of filtration. The first level of filtration may filter information associated with the purchase transaction and other historical transaction information associated with a payment vehicle of the consumer to determine whether the amount of the purchase transaction conforms to the historical transaction patterns. The system may determine whether or not the amount of the purchase transaction conforms to the historical transactions patterns in a number of methods.

In some embodiments, a first method may involve, initially determining transaction amount thresholds based on the transaction historical of the payment vehicle involved in the purchase transaction. For example, based on using the first method, the system may determine that normally transaction amounts using the payment vehicle does not exceed $500 and that the average transaction amount for the payment vehicle is $225. In this way, the system determines, at least two thresholds, a maximum transaction amount and average transaction amount based on the transaction history of the payment vehicle, where the maximum transaction amount represents the highest transaction amount value over a defined period of time. Still, using the first method, the system may then compare the amount of the purchase transaction to both the average transaction amount of $225 ($1^{st}$ threshold) and maximum transaction amount of $500 ($2^{nd}$ threshold). Such that when, in some embodiments, the amount of the purchase transaction exceeds the $1^{st}$ threshold a first indication of potential/likelihood of exposure to loss is determined. And when, in some embodiments, the amount of the purchase transaction exceeds the $2^{nd}$ threshold a second indication of potential/likelihood of exposure to loss determined. The indication of potential/likelihood of exposure to loss may be scaled such that as the amount of the purchase transaction exceeds an increasing number of thresholds, the potential or likelihood of loss also increases (e.g., exceeding $1^{st}$=40% chance of loss, exceeding $2^{nd}$=60% chance of loss, exceeding $3^{rd}$=85% chance of loss, and the like). It will be understood that the system should not be limited by the above example and that the system may have an unlimited number of thresholds for determining the potential of exposure to loss.

Of note, the filtration used to determine potential of exposure to loss of a purchase transaction is not necessarily the singular analysis of a single attribute (such as a transaction amount), but may be a low-level analysis of one or more of a plurality of attributes. Indeed, the filtration may analyze at least one of a plurality of attributes such as, but not limited to, the amount, the payee, the location, the channel, the date and/or time, velocity data, non-monetary account changes data, token usage data, and the like of a transaction, and thereafter other stages of filtration may or may not be utilized to further filter other attributes of the transaction that may lead to financial loss using one or more of the attributes described herein. For example, the frequency and/or velocity of transactions may also be analyzed in a similar manner, such that the transaction history of the payment vehicle involving in a purchase transaction is used to determine a first threshold and a second threshold to be used in determining the potential of exposure to loss.

A second method of determining a potential exposure to loss involves first identifying historical transaction patterns associated with a payment vehicle involved in a purchase transaction. Second, associating one or more standard deviations from the mean for each historical transaction pattern with a different likelihood or potential of exposure to loss. So that, when an amount of the purchase transaction or a velocity of the purchase transactions associated with the purchase vehicle meets or exceeds standard deviations from the mean of the historical transaction pattern, a probability or percentage value of potential for exposure may be determined (e.g., meet or exceed $1^{st}$ st. dev.=35%, meet or exceed $2^{nd}$ st. dev.=55%, meet or exceed $3^{rd}$ st. dev.=80%, and the like).

A third method of determining a potential of exposure to loss involves first identifying historical transaction patterns associated with a payment vehicle involved in a purchase transaction. Second, comparing an amount of a purchase transaction to the pattern and determining that a meaningful potential of exposure to loss exists when the amount of the purchase transaction falls outside of the historical transaction pattern. For any of the above described methods for determining a potential of exposure to loss, the system may determine an outliers or purchase transactions that fall outside of the thresholds or patterns to be anomalous.

The next step of method 500 is to determine that the digital wallet has at least one additional associated payment credential (step 520). In some embodiments, the mobile device of the user determines that the payment credential that has been potential exposed is associated with a particular digital wallet. Then, the mobile device determines that there are other payment credentials associated with the digital wallet. In some cases, exposure reduction measure(s) are taken with regard to the digital wallet as a conduit for information to the user (e.g., an alert is provided only to the digital wallet) and in other cases, exposure reduction measure(s) are taken with regard to each individual payment credential associated with the digital wallet in an individual fashion (e.g., an alert is sent to each payment credential individually, such as to an online banking website, email or other information channel associated with the payment credential).

In response to determining the potential exposure has been detected and determining that the digital wallet has at least one additional associated payment credential, the method includes initiating at least one exposure reduction measure intended to reduce potential exposure to the at least one additional associated payment credential (step 530).

The exposure reduction measure(s) may be one or more of a variety of measure(s). In some embodiments, the measure(s) include initiating at least one alert corresponding to the at least one second payment credential, where the second payment credential is associated with the same digital wallet as the first payment credential determined to have an associated potential exposure.

In various embodiments, the alert includes information indicating that a potential exposure associated with another payment credential has been detected. In some cases, details regarding the association are included, such as, that the payment credentials are associated with the same digital wallet.

In some embodiments, in order to prevent any additional potential exposure, the system initiates cancellation of the at least one second payment credential. Then, the system may initiate an alert corresponding to the cancelled second payment credential indicating that the second payment credential has been or is being cancelled. In this way, the user is informed both that the payment credential has been cancelled as well as, in some embodiments, that there was a potential exposure to another payment credential associated with the digital wallet.

In some cases, the system asks the user whether the potential exposed payment credential(s) should be re-issued. In other words, the system may ask, in some cases, whether the first payment credential (i.e., the payment credential determined to be associated with a potential exposure) should be re-issued. Likewise, the system may ask, in some cases, whether the second payment credential (or other payment credentials associated with the same digital wallet) should be cancelled and re-issued (and in the cases where they have already been cancelled, merely whether they should be re-issued). The system then enables the user to input an indication regarding whether the payment credential(s) should be cancelled and/or re-issued.

The token generated by the system for re-issuance may be a restricted or limited token that mitigates the exposure to loss. The token may be limited in a number of ways and the limitations and restrictions of the token may be based at least in part of the attributes of the purchase transaction or other circumstances involving the purchase transaction or payment vehicle involved in the purchase transaction. Thus, in some embodiments, upon identifying an anomalous purchase transaction based on a large purchase amount, the system may generate a token that limits the purchasing power of the payment vehicle that is tied to the token. For example, the system of the present invention may identify an amount of a purchase transaction of $500, which exceeds an average transaction amount of $125 of the bank card involved in the purchase transaction. In such an example, the system automatically generates a token that limits the purchase power of the bank card to $550 so that if the purchase transaction involves a compromised bank card or involves misappropriation, the maximum exposure using the bank card is $550. Further, in such an example, the bank card of the consumer prior to the anomalous purchase transaction may have had purchasing power of up to $10,000. However, the system generated token modifies the attributes and features associated with the bank card so that the purchasing power is reduced to $550 based on identifying an anomalous transaction involving the bank card. In some embodiments, the purchasing power of the bank card is not restored until the owner or holder of the bank card fully authenticates himself or communicates with the issuer of the bank card to provide sufficient rationale that explains the anomalous transaction.

In some embodiments, the generated token comprises computer-executable instructions or code and other information for modifying one or more attributes of a payment vehicles. As described above, the instructions or code may limit the purchasing power (e.g., available funds or available credit) of a payment vehicle. Additionally or alternatively, the instructions may further limit the geographic locations at which the payment vehicle may be used, the merchants and merchant locations at which the payment vehicle can be used, and the like. Similarly, the instructions or code may convert the payment vehicle from an unlimited use to a limited use payment vehicle. For example, the payment vehicle may initially be identified as a credit card, which is a revolving account with unlimited use. However, based on determining that the credit card is being used in an anomalous transaction the system may generate a token that limits the use of the credit card to two or three overall transactions so that the potential for loss is limited to those two or three transactions if it is subsequently determined that the payment vehicle was compromised or the transactions involved misappropriation. It will be understood that the generated token can be used to modify any attribute of a payment vehicle and not only the examples described herein. As an example, the generated token may alter a bank card of a consumer such that it can only be used at certain times of the day. This modification may be made in combination with several other modifications including modifying the available credit or available funds of a payment vehicle, the permissible merchants at which the payment vehicle may be used, the permissible geographic locations at which the payment vehicle may be used, and the like.

In many embodiments, a generated second token is a limited or restricted token as compared to the initial or first token. The first token therefore may provide general usage attributes to the payment vehicle, whereas the second token reduces the attributes or otherwise modifies the attributes of the payment vehicle so that the usage of the payment vehicle having the second token is diminished when compared to the payment vehicle having the first token. It will be understood that, in some embodiments, the system may not issue a new second token but instead, modifying the first token or the previously issued token associated with the payment vehicle to a limited or restricted token.

The system may provide a notification to the user indicating that a token was generated. In some embodiments, the notification further includes instructions for restoring a previously issued token to a payment vehicle or instructions for issuing another token that does not have the limitations or restrictions of the generated token.

Referring now to FIG. 6, a flowchart illustrates a method for reducing potential exposure. The first step, represented by block 610, is to determine that a potential exposure associated with the apparatus has been detected. The next step, represented by block 620, is to determine that the apparatus has at least one associated payment credential and, in response to 610 and 620, deactivate the at least one payment credential. In this regard, a mobile device and/or another system may deactivate any payment credential associated with a mobile device in the event that a payment credential associated with the mobile device has been detected to be associated with a potential exposure. In some embodiments, the detection involves a loss or theft of the mobile device, and, therefore, all the payment credentials associated with the mobile device are deactivated.

In some embodiments, the digital wallet management interface is accessed by a customer authenticated through an online banking session administered by a financial institution also administering the digital wallet. In some embodiments, the interface is accessed by a customer authenticated through a mobile banking application session administered by a financial institution also administering the digital wallet.

According to embodiments of the invention, a customer can operate "toggles" or switches that turn on/off token functionality for various situations. For example, the customer may turn on the "travel toggle", which indicates that the customer is traveling. A token may be changed and then, when the "toggle" is removed, the token may be changed again.

Referring now to FIG. 7, a flowchart illustrates a method 700 for token management according to embodiments of the invention. The method 700 includes, as represented by block 710, initiating presentation of a digital wallet. The next step, represented by block 720, is to initiate presentation of an original token associated with the digital wallet. Finally, as represented by block 730, the system initiates presentation of a toggle switch comprising a first position and a second position.

The toggle switch is associated with the original token and is configured for graphical manipulation by the user. The toggle switch may have a first and a second position in some embodiments, where the first position corresponds to the original token being available for use as a payment credential, and the second position corresponds to the original token being unavailable for use as a payment credential.

In various embodiments, a travel indicator may be configured such that the first position corresponds to the user not traveling and the second position corresponds to the user traveling. In some cases, when the travel indicator is moved from the first position to the second position, the original token is deactivated and a new token is issued to the digital wallet.

In some embodiments, when the travel indicator is moved from the second position to the first position, the new token is deactivated and the original token is re-activated. In some cases, when the travel indicator is moved from the second position to the first position, the new token is deactivated and the second new token is issued to the digital wallet. In some embodiments, the system destroys the original token and/or the new token.

In some embodiments, there may be multiple toggle switches associated with a single payment credential. In some cases, each of the toggle switches may be locked or immovable by the customer based on whether the financial institution or other administering entity allows the toggles to be moved in a particular situation. For example, in some cases, a toggle switch may be associated with traveling, and if it is determined the customer is not traveling (based on, e.g., GPS data), then the toggle switch may be disengaged or immovable by the customer. In some embodiments, the system may propose a particular toggle switch position to the customer via the interface. For example, when it is determined that the customer is traveling (e.g., by using GPS data), then the interface may propose that a travel toggle switch should be activated. Once the user confirms that the user is traveling, then the system activates the travel toggle switch, or in some cases, the user then activates the travel toggle switch manually.

According to embodiments of the invention, a payment credential-centric interface provides the customer visibility into every payment obligation (one time, recurring or otherwise) associated with a payment credential by providing information and management opportunities. The interface may also provide recurring payment information, and "push-button billpay enrollment".

In various embodiments, the payment credential(s) that have been deactivated may be re-activated. For example, in some cases, after a predetermined period of time, the payment credential(s) may be reactivated, or in other cases, the system may send a message to the user requesting input whether to reactivate one or more of the deactivated payment credential(s) and/or re-issue new payment credential(s).

It will further be understood that the system having the process flow 400 can be configured to perform any of the portions of the process flows 500 and/or 600 upon or after one or more triggering events (which, in some embodiments, is one or more any of the portions of the process flows 500 and/or 600). As used herein, "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the system performing any of the portions of the process flows 500 and/or 600 is configured such that the system receiving an indication of a compromised payment vehicle or a potential exposure to loss (the triggering event) automatically and immediately or nearly immediately triggers the system to automatically (without human intervention) generate a token for facilitating or completing a pending purchase transaction (the triggered action).

Also it will be understood that, in some embodiments, a predetermined time and/or the passage of a predetermined per any of the portions of the process flows 500 and/or 600. Of course, any of the embodiments described and/or contemplated herein can involve one or more triggering events, triggered actions, automatic actions, and/or human actions.

In addition, it will be understood that, in some embodiments, a system performing any of the portions of the process flows 500 and/or 600 (and/or a user thereof) is configured to perform each portion of the process flows 500 and/or 600, from start to finish, within moments, seconds, and/or minutes (e.g., within approximately 10-15 minutes, etc.). In some embodiments, any of the portions of the process flows 500 and/or 600 are performed in real time, in substantially real time, and/or at one or more predetermined times. Further, it will be understood that the number, order, and/or content of any of the portions of the process flows 500 and/or 600 are exemplary and may vary. It will further be understood that the any of the portions of the process flows 500 and/or 600 can be configured to perform any one or more of the portions of any one or more of the embodiments described and/or contemplated herein.

In various embodiments of the invention, transaction limits and/or thresholds may be used. For example, transaction limits may be used to determine whether a payment credential has been exposed. If a transaction (e.g., transaction information) fails to meet a limit, the transaction may be denied. Alternatively, if a transaction (e.g., transaction information) meets a limit, then the transaction may be allowed.

While the system has been described as determining whether the transaction meets the limits and thereby determining whether an exposure has occurred, in some embodiments filters for determining exposure may also be responsive to transaction information. For example, exceptions to filters may allow a transaction even if a filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/196,816 | MANAGED DIGITAL WALLETS | Concurrently Herewith |
| 14/196,798 | TOKEN COLLABORATION NETWORK | Concurrently Herewith |
| 14/196,802 | FORMATION AND FUNDING OF A SHARED TOKEN | Concurrently Herewith |
| 14/196,364 | LIMITING TOKEN COLLABORATION NETWORK USAGE BY USER | Concurrently Herewith |
| 14/196,373 | LIMITING TOKEN COLLABORATION NETWORK USAGE BY TOKEN | Concurrently Herewith |
| 14/196,809 | LIMITING THE USE OF A TOKEN BASED ON A USER LOCATION | Concurrently Herewith |
| 14/196,813 | AUTHORIZING A TEMPORARY TOKEN FOR A USER | Concurrently Herewith |
| 14/196,030 | CONTROLLING TOKEN ISSUANCE BASED ON EXPOSURE | Concurrently Herewith |
| 14/196,292 | FLEXIBLE FUNDING ACCOUNT TOKEN ASSOCIATIONS | Concurrently Herewith |
| 14/196,350 | ACCOUNT TOKEN ASSOCIATIONS BASED ON SPENDING THRESHOLDS | Concurrently Herewith |
| 14/196,383 | ONLINE BANKING DIGITAL WALLET MANAGEMENT | Concurrently Herewith |
| 14/196,653 | CUSTOMER TOKEN PREFERENCES INTERFACE | Concurrently Herewith |
| 14/196,752 | CREDENTIAL PAYMENT OBLIGATION VISIBILITY | Concurrently Herewith |
| 14/196,919 | PROVIDING SUPPLEMENTAL ACCOUNT INFORMATION IN DIGITAL WALLETS | Concurrently Herewith |
| 14/196,894 | PROVIDING OFFERS ASSOCIATED WITH PAYMENT CREDENTIALS IN DIGITAL WALLETS | Concurrently Herewith |
| 14/196,869 | PROVIDING OFFERS ASSOCIATED WITH PAYMENT CREDENTIALS AUTHENTICATED IN A SPECIFIC DIGITAL WALLET | Concurrently Herewith |
| 14/196,257 | FOREIGN EXCHANGE TOKEN | Concurrently Herewith |
| 14/196,274 | FOREIGN CROSS-ISSUED TOKEN | Concurrently Herewith |
| 14/196,460 | MOBILE DEVICE CREDENTIAL EXPOSURE REDUCTION | Concurrently Herewith |
| 14/196,947 | ATM TOKEN CASH WITHDRAWAL | Concurrently Herewith |
| 14/196,034 | RESTORING OR REISSUING OF A TOKEN BASED ON USER AUTHENTICATION | Concurrently Herewith |
| 14/196,405 | TOKEN USAGE SCALING BASED ON DETERMINED LEVEL OF EXPOSURE | Concurrently Herewith |

What is claimed is:

1. An apparatus for dynamic deactivation of an additional associated payment credential and issuance of a new payment credential to a digital wallet, whereby the apparatus determines a potential exposure of a payment credential in the digital wallet and initiates exposure reduction measures of deactivating the additional associated payment credential to reduce potential exposure of other payment credentials in the digital wallet, the apparatus comprising:

a memory;

a processor; and a module stored in the memory, executable by the processor, and configured to:

authenticate a user to a mobile application running on the apparatus;

authenticate the user to a digital wallet based on an effective authentication of the user to the mobile application running on the apparatus;

determine that a potential exposure associated with a first payment credential associated with the digital wallet has been detected;

determine that the digital wallet has at least one additional associated payment credential; and in response to determining the potential exposure has been detected and determining that the digital wallet has at least one additional associated payment credential, initiate at least one exposure reduction measure intended to reduce potential exposure to the at least one additional associated payment credential, comprising:

initiating presentation of a travel toggle switch corresponding to the at least one additional associated payment credential and configured for graphical manipulation by the user between at least a first position and a second position, wherein the first position corresponds to the user not desiring the at least one additional associated payment credential to be deactivated and the second position corresponds to the user desiring the at least one additional associated payment credential to be deactivated;

determining that the user is traveling, whereby the travel toggle switch is activated for receiving input from the user;

in response to the toggle switch moving from the first position to the second position, deactivating the at least one additional associated payment credential;

issuing a new payment token to the at least one digital wallet, wherein the new payment token comprises computer executable instructions for modifying attributes of the new payment token to convert the new payment token from an unlimited use token to a limited use token, wherein the computer executable instructions for modifying attributes of the new payment token are structured to: (i) limit geographic locations at which the new payment token can be used, (ii) limit the time of day the new payment token can be used to a predetermined time interval, and (iii) limit the number of times the new payment token can be used to a predetermined number of uses; and determining that the user is not traveling, and in response, deactivating the travel toggle switch for receiving input from the user;

wherein determining the potential exposure associated with the first payment credential comprises:

identifying an activity associated with the first payment credential having an activity amount;

determining a first level of exposure, wherein determining the first level of exposure comprises identifying at least two thresholds associated with the user, comprising a maximum amount threshold and an average amount threshold, and scaling the potential exposure based on the activity amount exceeding the maximum amount threshold and/or exceeding the average amount threshold; and determining a second level of exposure, wherein determining the second level of exposure comprises determining at least two standard deviations each associated with a mean of a historical activity pattern associated with the user, and determining a probability of potential exposure based on the activity amount exceeding at least one of the at least two standard deviations.

2. The apparatus of claim 1, wherein initiating at least one exposure reduction measure comprises:
initiating at least one alert corresponding to the at least one second payment credential.

3. The apparatus of claim 2, wherein the at least one alert comprises information indicating that a potential exposure associated with another payment credential associated with the digital wallet has been detected.

4. The apparatus of claim 1, wherein initiating at least one exposure reduction measure comprises:
initiating cancellation of the at least one second payment credential; and
initiating at least one alert corresponding to the at least one second payment credential, wherein the alert comprises information indicating the at least one second payment credential has been or is being cancelled.

5. The apparatus of claim 4, wherein initiating at least one exposure reduction measure further comprises:
initiating at least one message asking a customer associated with the digital wallet whether the first payment credential or the at least one second payment credentials should be re-issued.

6. The apparatus of claim 2, wherein initiating at least one alert corresponding to the at least one second payment credentials comprises initiating at least one message asking a customer associated with the digital wallet whether the at least one second payment credential should be cancelled.

7. The apparatus of claim 6, wherein the module is further configured to:
receive customer input indicating that the at least one second payment credential should be cancelled; and
in response, initiating cancellation of the at least one second payment credential.

8. The apparatus of claim 7, wherein the module is further configured to:
in response to receiving customer input indicating that the at least one second payment credential should be cancelled, initiating issuance of at least one new payment credential for replacing the at least one second payment credential.

9. The apparatus of claim 7, wherein the module is further configured to:
in response to receiving customer input indicating that the at least one second payment credential should be cancelled, initiating at least one message asking the customer whether a new payment credential should be issued.

10. The apparatus of claim 9, wherein the module is further configured to:
receive customer input indicating that a new payment credential should be issued; and
initiate issuance of at least one new payment credential for replacing the at least one second payment credential.

11. The apparatus of claim 1, wherein initiating at least one exposure reduction measure comprises:
initiating at least one alert corresponding to the digital wallet, wherein the at least one alert comprises instructions to communicate the at least one alert to all payment credentials associated with the digital wallet.

12. The apparatus of claim 11, wherein the module is further configured to:
receive the instructions to communicate the at least one alert to all payment credentials associated with the digital wallet; and
initiate communication of at least one message to the customer for each payment credential associated with the digital wallet.

13. The apparatus of claim 12, wherein the at least one message is communicated as a pop-up message on the apparatus.

14. A method for dynamic deactivation of an additional associated payment credential and issuance of a new payment credential to a digital wallet, whereby a processor determines a potential exposure of a payment credential in the digital wallet and initiates exposure reduction measures of deactivating the additional associated payment credential to reduce potential exposure of other payment credentials in the digital wallet, the method comprising:
authenticating a user to a mobile application running on the apparatus;
authenticating the user to a digital wallet based on an effective authentication of the user to the mobile application running on the apparatus;

determining, by a processor, that a potential exposure associated with a first payment credential associated with the digital wallet has been detected;

determining, by the processor, that the digital wallet has at least one additional associated payment credential; and in response to determining the potential exposure has been detected and determining that the digital wallet has at least one additional associated payment credential, initiating, by the processor, at least one exposure reduction measure intended to reduce potential exposure to the at least one additional associated payment credential, comprising:

initiating presentation of a travel toggle switch corresponding to the at least one additional associated payment credential and configured for graphical manipulation by the user between at least a first position and a second position, wherein the first position corresponds to the user not desiring the at least one additional associated payment credential to be deactivated and the second position corresponds to the user desiring the at least one additional associated payment credential to be deactivated;

determining that the user is traveling, whereby the travel toggle switch is activated for receiving input from the user;

in response to the toggle switch moving from the first position to the second position, deactivating the at least one additional associated payment credential;

issuing a new payment token to the at least one digital wallet, wherein the new payment token comprises computer executable instructions for modifying attributes of the new payment token to convert the new payment token from an unlimited use token to a limited use token, wherein the computer executable instructions for modifying attributes of the new payment token are structured to: (i) limit geographic locations at which the new payment token can be used, (ii) limit the time of day the new payment token can be used to a predetermined time interval, and (iii) limit the number of times the new payment token can be used to a predetermined number of uses; and determining that the user is not traveling, and in response, deactivating the travel toggle switch for receiving input from the user;

wherein determining the potential exposure associated with the first payment credential comprises:

identifying an activity associated with the first payment credential having an activity amount;

determining a first level of exposure, wherein determining the first level of exposure comprises identifying at least two thresholds associated with the user, comprising a maximum amount threshold and an average amount threshold, and scaling the potential exposure based on the activity amount exceeding the maximum amount threshold and/or exceeding the average amount threshold; and determining a second level of exposure, wherein determining the second level of exposure comprises determining at least two standard deviations each associated with a mean of a historical activity pattern associated with the user, and determining a probability of potential exposure based on the activity amount exceeding at least one of the at least two standard deviations.

15. The method of claim 14, wherein initiating at least one exposure reduction measure comprises:

initiating at least one alert corresponding to the at least one second payment credential.

16. The method of claim 15, wherein the at least one alert comprises information indicating that a potential exposure associated with another payment credential associated with the digital wallet has been detected.

17. The method of claim 14, wherein initiating at least one exposure reduction measure comprises:

initiating cancellation of the at least one second payment credential; and initiating at least one alert corresponding to the at least one second payment credential, wherein the alert comprises information indicating the at least one second payment credential has been or is being cancelled.

18. A computer program product for dynamic deactivation of an additional associated payment credential and issuance of a new payment credential to a digital wallet, whereby the computer program product determines a potential exposure of a payment credential in the digital wallet and initiates exposure reduction measures of deactivating the additional associated payment credential to reduce potential exposure of other payment credentials in the digital wallet, the computer program product comprising a non-transitory computer-readable medium comprising code causing a first apparatus to:

authenticate a user to a mobile application running on the apparatus;

authenticate the user to a digital wallet based on an effective authentication of the user to the mobile application running on the apparatus;

determine that a potential exposure associated with a first payment credential associated with the digital wallet has been detected;

determine that the digital wallet has at least one additional associated payment credential; and in response to determining the potential exposure has been detected and determining that the digital wallet has at least one additional associated payment credential, initiate at least one exposure reduction measure intended to reduce potential exposure to the at least one additional associated payment credential, comprising:

initiating presentation of a travel toggle switch corresponding to the at least one additional associated payment credential and configured for graphical manipulation by the user between at least a first position and a second position, wherein the first position corresponds to the user not desiring the at least one additional associated payment credential to be deactivated and the second position corresponds to the user desiring the at least one additional associated payment credential to be deactivated;

determining that the user is traveling, whereby the travel toggle switch is activated for receiving input from the user;

in response to the toggle switch moving from the first position to the second position, deactivating the at least one additional associated payment credential;

issuing a new payment token to the at least one digital wallet, wherein the new payment token comprises computer executable instructions for modifying attributes of the new payment token to convert the new payment token from an unlimited use token to a limited use token, wherein the computer executable instructions for modifying attributes of the new payment token are structured to: (i) limit geographic locations at which the new payment token can be used, (ii) limit the time of day the new payment token can be used to a predetermined time interval, and (iii) limit the number of times the new payment token can be used to a predetermined number of uses; and determining that the user is not traveling, and in response, deactivating the travel toggle switch for receiving input from the user;

wherein determining the potential exposure associated with the first payment credential comprises:

identifying an activity associated with the first payment credential having an activity amount;

determining a first level of exposure, wherein determining the first level of exposure comprises identifying at least two thresholds associated with the user, comprising a maximum amount threshold and an average amount threshold, and scaling the potential exposure based on the activity amount exceeding the maximum amount threshold and/or exceeding the average amount threshold; and determining a second level of exposure, wherein determining the second level of exposure comprises determining at least two standard deviations each associated with a mean of a historical activity pattern associated with the user, and determining a probability of potential exposure based on the activity amount exceeding at least one of the at least two standard deviations.

19. The computer program product of claim 18, wherein the code further causes the first apparatus to:

initiate at least one alert corresponding to the at least one second payment credential.

20. The computer program product of claim 19, wherein the at least one alert comprises information indicating that a potential exposure associated with another payment credential associated with the digital wallet has been detected.

* * * * *